United States Patent
Nguyen et al.

(10) Patent No.: US 10,740,030 B2
(45) Date of Patent: Aug. 11, 2020

(54) STOPPING A PLURALITY OF CENTRAL PROCESSING UNITS FOR DATA COLLECTION BASED ON ATTRIBUTES OF TASKS

(71) Applicant: International Business Machines Corporation, Armonk, NY (US)

(72) Inventors: Trung N. Nguyen, Vail, AZ (US); Louis A. Rasor, Tucson, AZ (US); Juan J. Ruiz, Daly City, CA (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 15/697,019

(22) Filed: Sep. 6, 2017

(65) Prior Publication Data

US 2019/0073157 A1    Mar. 7, 2019

(51) Int. Cl.
*G06F 9/46* (2006.01)
*G06F 3/06* (2006.01)
*G06F 9/52* (2006.01)
*G06F 9/48* (2006.01)

(52) U.S. Cl.
CPC ............ *G06F 3/0659* (2013.01); *G06F 9/485* (2013.01); *G06F 9/52* (2013.01); *G06F 2003/0697* (2013.01)

(58) Field of Classification Search
None
See application file for complete search history.

(56) References Cited

U.S. PATENT DOCUMENTS

| | | | | |
|---|---|---|---|---|
| 4,663,709 A | * | 5/1987 | Fujiwara | G06F 9/52 710/267 |
| 5,640,508 A | | 6/1997 | Fujiwara et al. | |
| 5,978,830 A | * | 11/1999 | Nakaya | G06F 8/456 718/102 |
| 6,002,851 A | * | 12/1999 | Basavaiah | G06F 11/1425 709/221 |
| 6,823,516 B1 | | 11/2004 | Cooper | |
| 8,151,098 B2 | | 4/2012 | Niwa et al. | |

(Continued)

FOREIGN PATENT DOCUMENTS

WO    2012036954    3/2012

OTHER PUBLICATIONS

List of IBM Patents or Patent Applications Treated as Related, dated Sep. 7, 2017, Total 2 pp.

(Continued)

*Primary Examiner* — Van H Nguyen
(74) *Attorney, Agent, or Firm* — Rabindranath Dutta; Konrad, Raynes, Davda and Victor LLP

(57) ABSTRACT

An indication is made for each task category of a plurality of task categories, of a first attribute that indicates a data set to be collected, a second attribute that indicates a first predetermined amount of time within which a central processing unit (CPU) stops executing a task of the task category, and a third attribute that indicates a second predetermined amount of time within which the CPU that was executing the task of the task category collects the data set. In response to occurrence of an event, a plurality of CPUs are stopped to collect a plurality of data sets, based on first attributes, second attributes, and third attributes of task categories corresponding to tasks executing on the plurality of CPUs.

18 Claims, 10 Drawing Sheets

(56) References Cited

U.S. PATENT DOCUMENTS

| | | | |
|---|---|---|---|
| 8,516,487 B2* | 8/2013 | Felton | G06F 9/4856 718/102 |
| 9,256,500 B2 | 2/2016 | Schulz et al. | |
| 9,459,974 B2* | 10/2016 | He | G06F 11/2094 |
| 2008/0189685 A1* | 8/2008 | Aoki | G06F 9/485 717/120 |
| 2009/0089336 A1 | 4/2009 | Dewey et al. | |
| 2010/0262971 A1 | 10/2010 | Yamada | |
| 2011/0078702 A1* | 3/2011 | Hosoki | G06F 9/461 718/108 |
| 2011/0197196 A1* | 8/2011 | Felton | G06F 9/4856 718/104 |
| 2015/0347251 A1* | 12/2015 | He | G06F 11/2094 714/6.2 |
| 2017/0235627 A1 | 8/2017 | Rasor et al. | |

OTHER PUBLICATIONS

Lee et al., "Transparent CPU-GPU Collaboration for Data-Parallel Kernels on Heterogeneous Systems", dated 2015-2016, Advanced Computer Architecture Laboratory, Total 11 pages.

IBM "Efficient Monitoring of Plan Execution CPU Costs in a Database Server" dated Sep. 25, 2009, An IP.com Prior Art Database Technical Disclosure, Total 10 pages.

IBM, "Determination of Discrete Resources Shortages and Stopping the Culprit Task", dated Oct. 27, 2009, An IP.com Prior Art Database Technical Disclosure, Total 6 pages.

US Patent Application, dated Sep. 5, 2017, for U.S. Appl. No. 15/695,490 (18.753), filed Sep. 5, 2017, invented by Matthew Carson at al., Total 35 pages.

Office Action, dated Apr. 12, 2019, for U.S. Appl. No. 15/695,490 (18.753), filed Sep. 5, 2017, invented by Matthew Carson et al., Total 13 pages.

Response to Office Action, dated Jul. 12, 2019, for U.S. Appl. No. 15/695,490 (18.753), filed Sep. 5, 2017, invented by Matthew Carson et al., Total 9 pages.

Notice of Allowance, dated Aug. 1, 2019, for U.S. Appl. No. 15/695,490 (18.753), filed Sep. 5, 2017, invented by Matthew Carson el al., Total 14 pages.

Notice of Allowance, dated Nov. 21, 2019, for U.S. Appl. No. 15/695,490 (18.753), filed Sep. 5, 2017, invented by Matthew Carson el al., Total 10 pages.

* cited by examiner

STOPPING A PLURALITY OF CENTRAL PROCESSING UNITS FOR DATA COLLECTION BASED ON ATTRIBUTES OF TASKS

BACKGROUND

1. Field

Embodiments relate to the stopping of central processing units for data collection based on attributes of tasks.

2. Background

In certain computing environments, a computational device such as a storage controller may control access to storage for one or more host computational devices that may be coupled to the storage controller over a network. A storage management application that executes in the storage controller may manage a plurality of storage devices, such as disk drives, tape drives, flash drives, direct access storage devices (DASD), etc., that are coupled to the storage system. A host computational device may send Input/Output (I/O) commands to the storage controller and the storage controller may execute the I/O commands to read data from the storage devices or write data to the storage devices.

The storage controller may include two or more servers, where each server may be referred to as a node, a storage server, a processor complex, a Central Processor Complex (CPC), or a Central Electronics Complex (CEC). Each server may be included in a cluster. Each server may have a plurality of central processing units and the servers may share the workload of the storage controller. In certain computing environments, in which the storage controller includes two servers, either server can failover to the other if there is a failure or a planned downtime for one of the two servers.

In many situations, an application that executes in a computational device (such as, the storage controller), may generate an error condition during execution. In order to diagnose the reasons for the error condition, the state of the computational device at the time of the error condition may be recorded. The state of the computational device may be found in the recorded state of some or all of the working memory of the computational device and other elements of the computational device. The state of the computational device may also include information on program state, including processor registers, which may include the program counter and stack pointer, memory management information, and processor and operating system flags. The state of the computational device may be used to assist in diagnosing and debugging errors in applications. The state of the computational device may also be recorded in response to conditions other than error conditions.

SUMMARY OF THE PREFERRED EMBODIMENTS

Provided are a method, a system, a computer program product in which an indication is made for each task category of a plurality of task categories, of a first attribute that indicates a data set to be collected, a second attribute that indicates a first predetermined amount of time within which a central processing unit (CPU) stops executing a task of the task category, and a third attribute that indicates a second predetermined amount of time within which the CPU that was executing the task of the task category collects the data set. In response to occurrence of an event, a plurality of CPUs are stopped to collect a plurality of data sets, based on first attributes, second attributes, and third attributes of task categories corresponding to tasks executing on the plurality of CPUs.

In additional embodiments, in response to completion of collecting of a data set via a selected CPU that was executing a selected task at a time of stopping the selected CPU for the collecting of the data set, execution of the selected task in the selected CPU is resumed.

In further embodiments, the data set is a selected data set that is indicative of a state of a computational device, wherein for a selected CPU that is executing a selected task: the first predetermined amount of time comprises a stop time that indicates an amount of time within which the selected CPU executing the selected task has to stop executing the selected task; the second predetermined amount of time comprises a data set collection time that indicates an amount of time within which a selected data set is to be collected after stopping the selected CPU executing the selected task; and the first attribute includes a function that when executed causes the selected data set to be collected.

In certain embodiments, tasks associated with the task category have to be completed within a third predetermined amount of time, wherein the first predetermined amount of time and the second predetermined amount of time are set such that the tasks associated with the task category are completed within the third predetermined amount of time.

In additional embodiments, different data sets are collected for different types of tasks with different time requirements.

In further embodiments, different CPUs are stopped from executing different tasks for different amounts of time.

In certain embodiments, different CPUs collect different data sets for different amounts of time.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A computational device, such as a storage controller, may include a plurality of CPUs, wherein the plurality of CPUs may perform a plurality of tasks in parallel. There is a need for collecting certain types of state information in the storage controller, in response to the occurrence of certain events, such as error conditions or some other conditions triggered within the storage controller.

A mechanism to collect the state information is to stop all CPUs that are running tasks. The CPUs may be stopped for a short amount of time, to collect the state information, and then the CPUs may resume operations. In such mechanisms, all CPUs are stopped for the same amount of time to collect the same state information regardless of the tasks the CPUs are running. However, depending on which tasks are running, it may be desirable to collect specific data sets reflecting a subset of the state information. Additionally there may be a time limit on how long a CPU that is running a task can be stopped, based on the timing requirements of the task.

For example, a task that is associated with a point to point link between the storage controller and a host computational device may have a read/write performance requirement of 20-37 microseconds, so taking 1 second to collect the state information is not feasible while at the same time satisfying the performance requirement of the task. It may be desirable to collect different state information for different types of tasks, based on the performance requirements of different types of tasks.

Certain embodiments classify tasks into different types of task categories. Each task category has attributes that indicate the data set to be collected and timing requirements for collection of the data set. In response to the occurrence of an event, a CPU running a task collects a data set comprising state information, based on the indications provided in the attributes of the task category of the task.

Exemplary Embodiments

Figure 1:
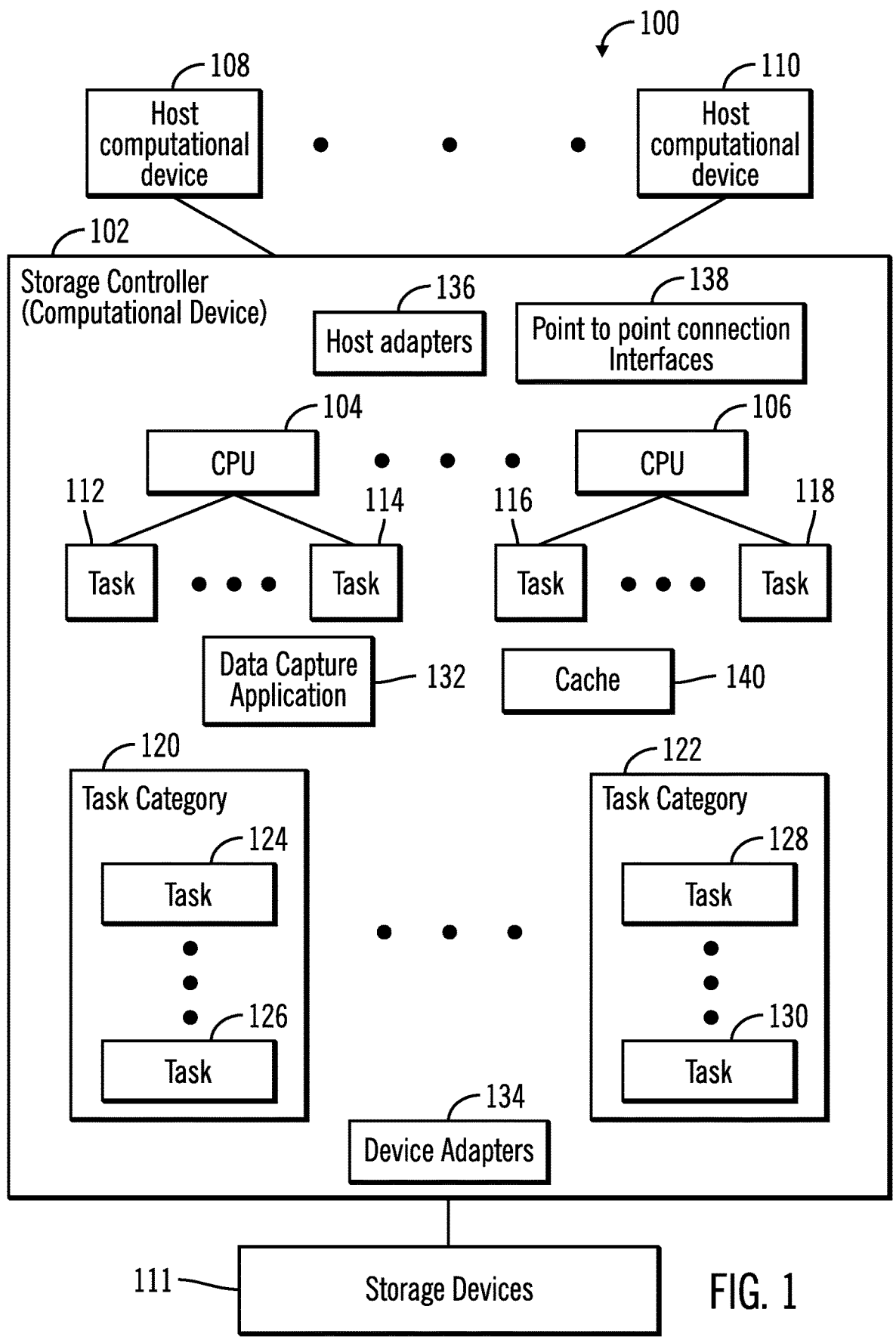
FIG. 1 illustrates a block diagram of a computing environment comprising a storage controller with a plurality of central processing units communicatively coupled to a plurality of host computational devices and a plurality of storage devices, in accordance with certain embodiments.

FIG. 1 illustrates a block diagram of a computing environment 100 comprising a storage controller 102 with a plurality of central processing units (CPUs) 104, 106 communicatively coupled to a plurality of host computational devices 108, 110 and a plurality of storage devices 111, in accordance with certain embodiments;

The storage controller 102 and the host computational devices 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The storage controller 102 may be comprised of a plurality of servers (not shown) that may provide redundancy because if one server undergoes a failure from which recovery is not possible, an alternate server may perform the functions of the server that failed. Each of the plurality of servers may be referred to as a processing complex or a central electronics complex (CEC) and may include one or more processors and/or processor cores, such as the CPUs 104, 106. The storage controller 102 may also be referred to as a dual-server storage system.

The storage controller 102 and the host computational devices 108, 110 may be elements in any suitable network, such as, a storage area network, a wide area network, the Internet, an intranet. In certain embodiments, the storage controller 102 and the host computational devices 108, 110 may be elements in a cloud computing environment. While only two CPUs are identified by reference numerals 104, 106 in FIG. 1, it is understood that there may be more than two CPUs in the storage controller 102.

In certain embodiments, a plurality of tasks may be executed in the plurality of CPUs 104, 106. For example, CPU 104 may execute a plurality of tasks 112, 114, and CPU 106 may execute a plurality of tasks 116, 118.

In certain embodiments, a task, such as task 112, may have response time requirements below a certain threshold (such as 30 milliseconds). For example, if the task 112 is for an I/O operation from the host computational device 108, then the I/O operation is responded to in a timely manner by the storage controller 102 from data stored in the storage devices 111 within the threshold amount of time.

A plurality of tasks that may potentially execute or are executing in the CPUs 104, 106 are placed in a plurality of task categories in the storage controller 102. For example, FIG. 1 shows a plurality of task categories 120, 122 where task category 120 includes the plurality of tasks 124, 126, and task category 122 includes the plurality of tasks 128, 130.

An event is an action or occurrence of a condition recognized by the storage controller 102. For example, an event may be triggered in response to an error condition or some other condition generated during the execution of an application in the storage controller 102. In certain embodiments, a data capture application 132 implemented in software, firmware, hardware or any combination thereof executes in the storage controller 102. In response to an occurrence of an event in the storage controller 102, the data capture application 132 determines the attributes of a task category 120, 122, and based on the attributes determines the amount of state information to collect for a task and the amount for time a CPU that is executing the task has to be stopped. For example, the data capture application 132 may for a selected task 112 stop the CPU 104 within a first predetermined amount of time (e.g., 5 milliseconds), and then collect a data set reflecting state information for a second predetermined amount of time (e.g., 70 milliseconds). By limiting the amount of time allocated for stopping selected CPUs and for collecting data sets, the timing constraints imposed on tasks is satisfied, while at the same time the collection of data sets is performed.

The plurality of tasks that are categorized into the task categories 120, 122 and execute in the CPUs 104, 106 may include tasks associated with at least the following elements that may be found in the storage controller 102:

(A) Tasks associated with device adapters 134 that communicatively couple the storage controller 102 to the storage devices 111;

(B) Tasks associated with host adapters 136 that communicatively couple the storage controller 102 to the host computational devices 108, 110;

(C) Tasks associated with point to point connection interfaces 138 that communicatively couple the storage controller 102 to the host computational devices 108, 110 via point to point connections, such as zHyperlink; and (D) Tasks associated with the cache 140 of the storage controller 102, where such tasks associated with the cache 140 may include staging tasks, destaging tasks, etc.

Therefore, FIG. 1 illustrates certain embodiments in which a data capture application 132 stops different tasks running on different CPUs for different amounts of time to collect different data sets reflecting different state information, for satisfying different performance requirements of different tasks.

Figure 2:
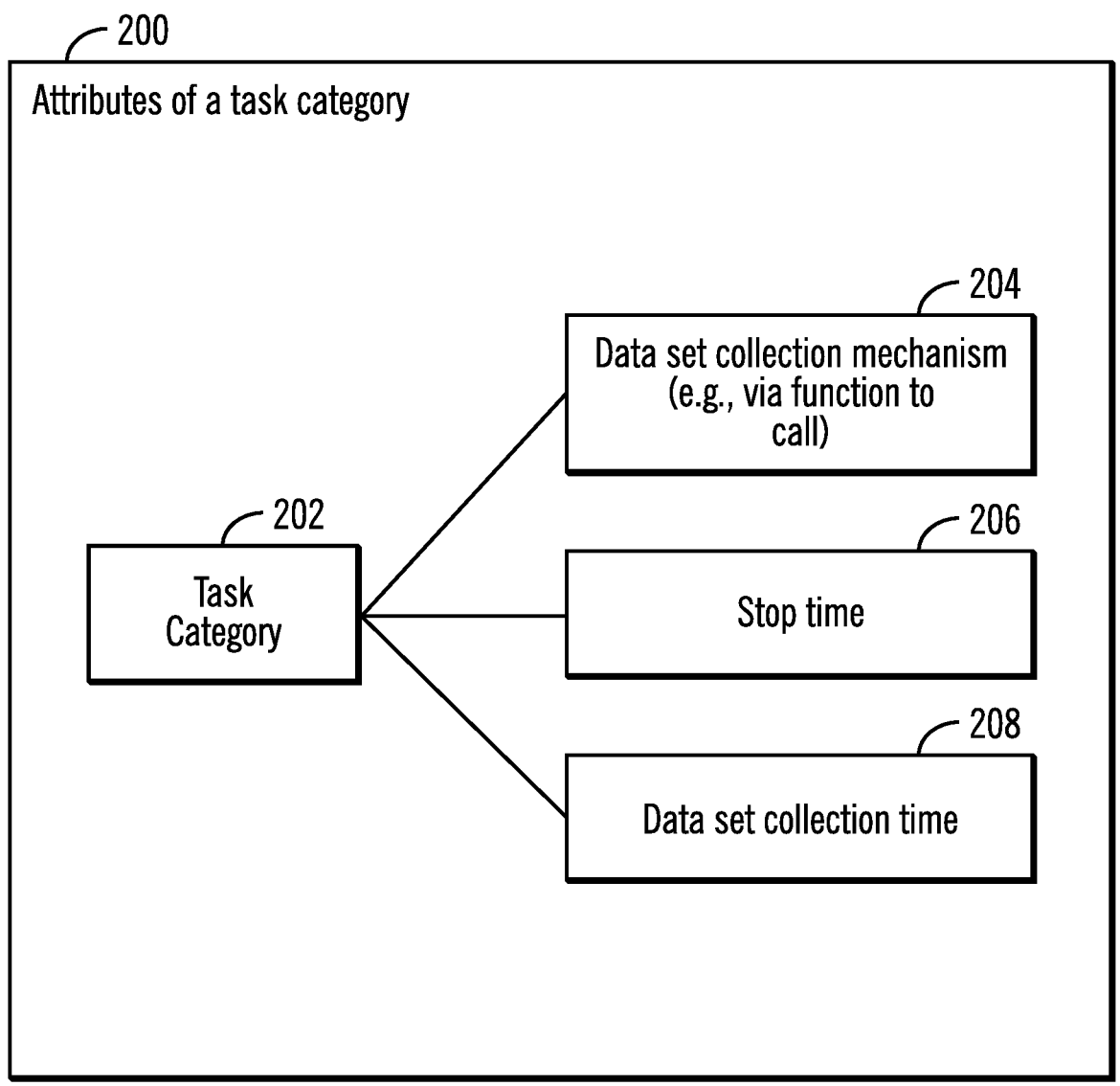
FIG. 2 illustrates a block diagram that shows attributes of a task category, in accordance with certain embodiments.

FIG. 2 illustrates a block diagram 200 that shows attributes of a task category 202, in accordance with certain embodiments.

A task category includes a plurality of tasks, and an exemplary task category 202 may have properties that include:

(A) A data set collection mechanism (reference numeral 204) comprising a function that when executed causes the data set comprising a state of the storage controller 102 to be collected;

(B) A stop time (reference numeral 206) that indicates an amount of time within which a CPU executing a task in the task category is to be stopped; and (D) A data set collection time (reference numeral 208) that indicates an amount of time within which a data set indicative of a state of the storage controller 102 is to be collected (i.e., determined) after stopping the CPU executing the a task in the task category 202.

Figure 3:
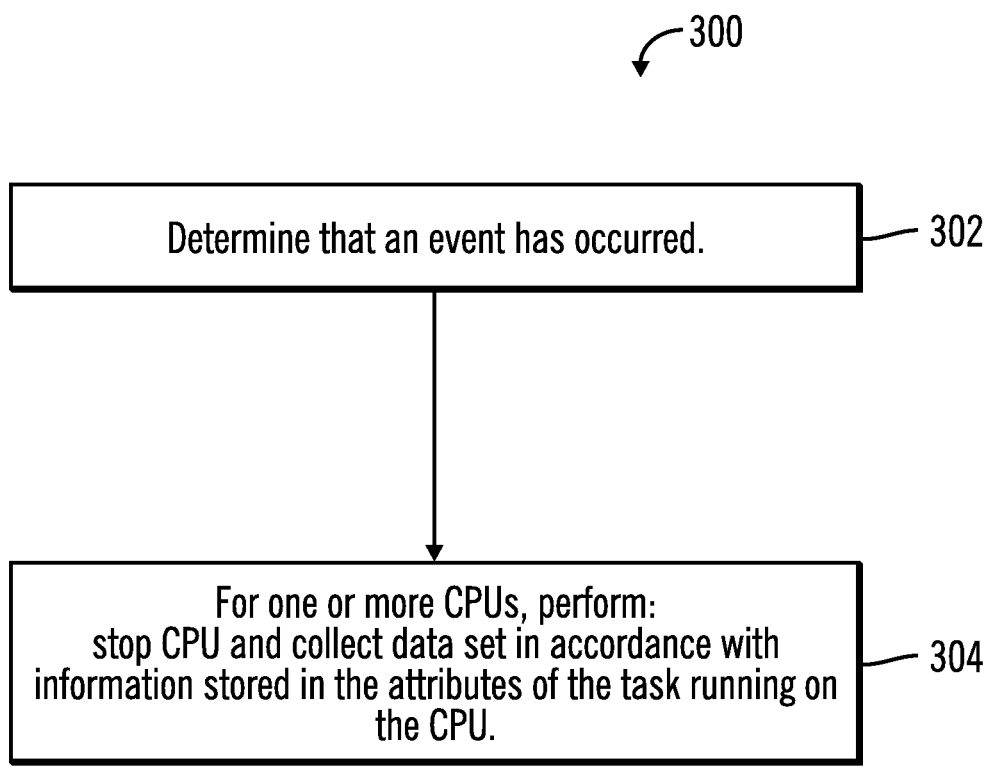
FIG. 3 illustrates a flowchart that shows operations performed by a plurality of CPUs, in response to an occurrence of an event, in accordance with certain embodiments.

FIG. 3 illustrates a flowchart 300 that shows operations performed by a plurality of CPUs, in response to an occurrence of an event, in accordance with certain embodiments. The operations shown in FIG. 3 may be performed by the data capture application 132 that executes in the storage controller 102.

Control starts at block 302 in which the data capture application 132 determines that an event that necessitates collecting one or more data sets corresponding to a state of the storage controller 102 has occurred.

From block 302 control proceeds to block 304 in which the data capture application 132 may perform operations in which for one or more CPUs in the plurality of CPUs 104, 106, the data capture application 132 stops the CPU and collects a data set in accordance with information stored in the attributes of the task running on the CPU.

Figure 4:
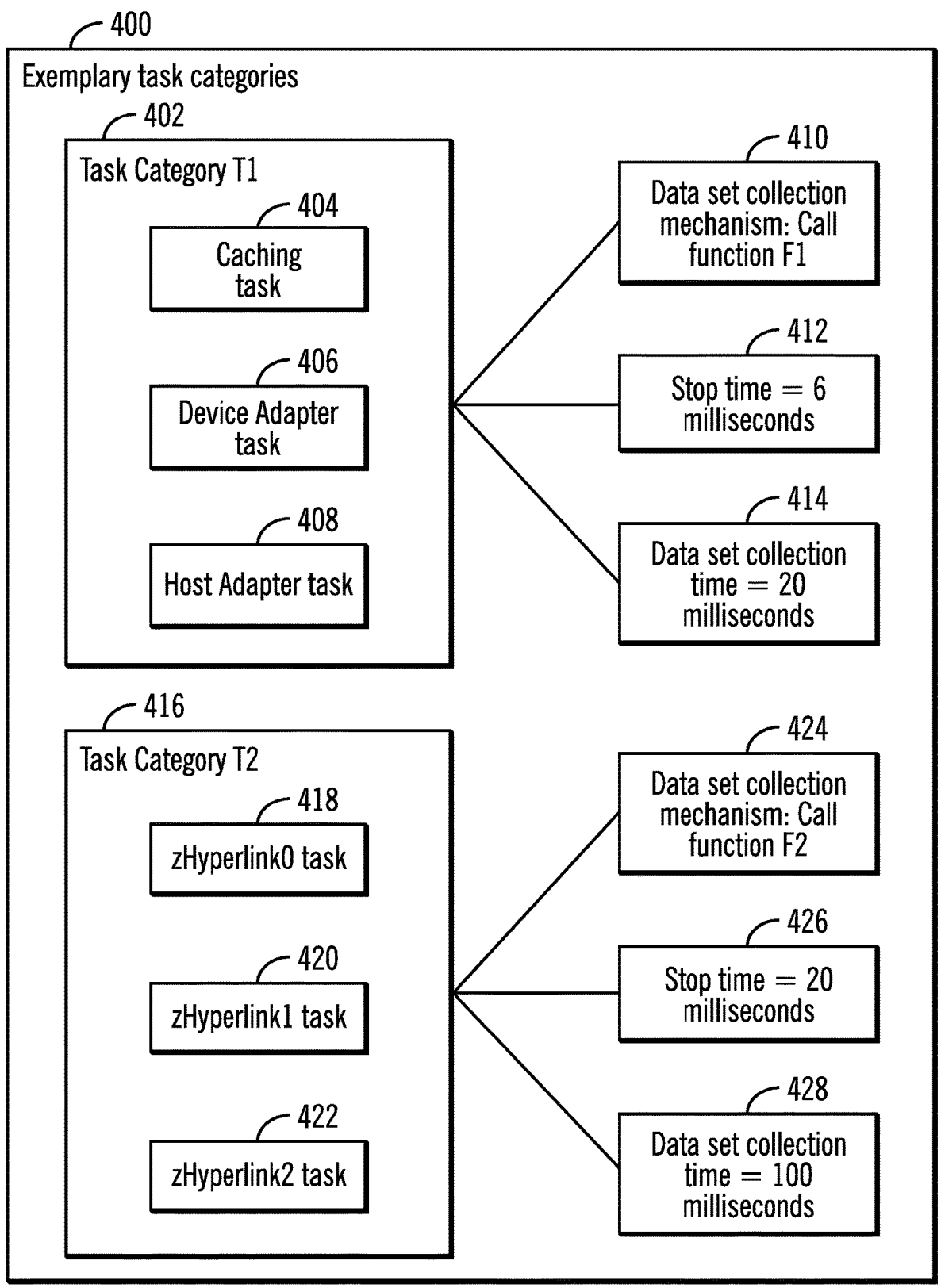
FIG. 4 illustrates a block diagram that shows a plurality of tasks grouped into a plurality of task categories, in accordance with certain embodiments.

FIG. 4 illustrates a block diagram 400 that shows a plurality of tasks grouped into a plurality of task categories, in accordance with certain embodiments.

A task category T1 402 may include caching tasks 404, device adapter tasks 406, and host adapter tasks 408 that may execute in the CPUs 104, 106. The data set collection mechanism for task category T1 402 includes calling function F1 (as shown via reference numeral 410). The stop time for each of the tasks in task category 402 is shown to be 6 milliseconds (as shown via reference numeral 412), and the data set collection time is shown to be 20 milliseconds (as shown via reference numeral 414).

A task category T2 416 may include zHyperlink tasks, such as a zHyperlink0 task 418, a zHyperlink1 task 420, and a zHyperlink2 task 422 that may execute in the CPUs 104, 106. The zHyperlink0, zHyperlink1, and zHyperlink2 tasks 418, 420, 422 are tasks corresponding to different point to point links for the storage controller 102 to the host computational devices 108, 110 via the point to point connection interfaces 138. The data set collection mechanism for task category T2 416 includes calling function F2 (as shown via reference numeral 424). The stop time for each of the tasks in task category T2 416 is shown to be 20 microseconds (as shown via reference numeral 426, and the data set collection time is shown to be 100 microseconds (as shown via reference numeral 428).

From FIG. 4, it can be seen that the tasks in the task category T2 416 have much "stricter" time requirements (i.e., must complete faster) for completion than tasks in the task category 402, as the stop time 412 and the data set collection time 414 for tasks in task category 402 are 6 milliseconds and 20 milliseconds respectively, whereas the stop time 426 and the data set collection time 428 for tasks in task category 416 are 20 microseconds and 100 microseconds respectively.

Figure 5:
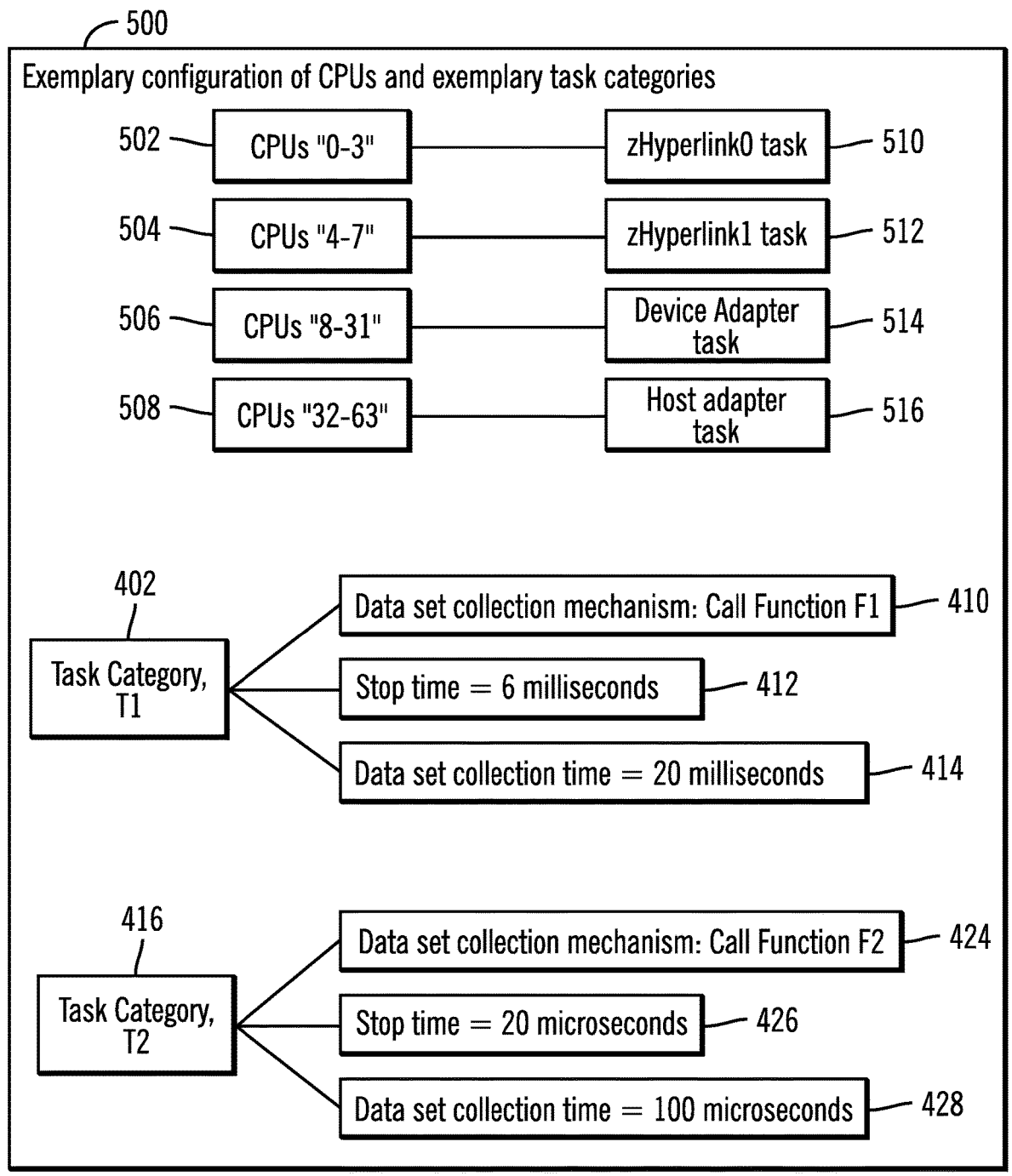
FIG. 5 illustrates a block diagram that shows an exemplary configuration of CPUs and exemplary task categories, in accordance with certain embodiments.

FIG. 5 illustrates a block diagram 500 that shows an exemplary configuration of CPUs and exemplary task categories, in accordance with certain embodiments;

FIG. 5 shows 64 CPUs numbered consecutively from 0 to 63 (shown via reference numeral 502, 504, 506, 508), where zHyperlink0 task 510 executes on CPUs "0-3" 502, zHyperlink1 task 512 executes on CPUs "4-7" 504, device adapter task 514 executes on CPUs "8-31" 506, and host adapter task 516 executes on CPUs "32-63" 518.

Two task categories that are indicated as task category T1 402 and task category T2 416 are also shown in FIG. 5 (in a manner similar to FIG. 4) with attributes 410, 412, 414 for task category T1 402, and attributes 424, 426, 428 for task category T2 416.

For embodiments shown in FIG. 5, zHyperlink0 task 510, and zHyperlink1 task 512 that are in task category T2 416 (as shown in FIGS. 4 and 5) may need to be completed in 150 microseconds to 200 microseconds, so the stop time 426 and the data set collection time 428 are set to 20 microseconds and 100 microseconds respectively for task category T2 416, in order to allow an adequate amount of time for zHyperlink0 task 510, and zHyperlink1 task 512, to complete, in case the CPUs "0-3" 502 and CPUs "4-7" 504 running the zHyperlink0 task 510, and the zHyperlink1 task 512, are stopped for data set collection.

Also for embodiments shown in FIG. 5, the device adapter task 514, and the host adapter task 516 of task category T1 402 (as shown in FIGS. 4 and 5) may need to be completed in 180 milliseconds to 200 milliseconds, so the stop time 412 and the data set collection time 414 are set to 6 milliseconds and 20 milliseconds respectively for task category T1 402, in order to allow an adequate amount of time for the device adapter task 514, and the host adapter task 516 to complete in case the CPUs "8-31" 506 running the device adapter task 514 and the CPUs "32-63" 508 running the host adapter task 516 are stopped.

Therefore, the stop time and the data set collection time for a task category are set such that the tasks stopped for task category can complete in time. If needed, a smaller data set is collected via the data set collection mechanism to meet the timing constraints of a task.

Figure 6:
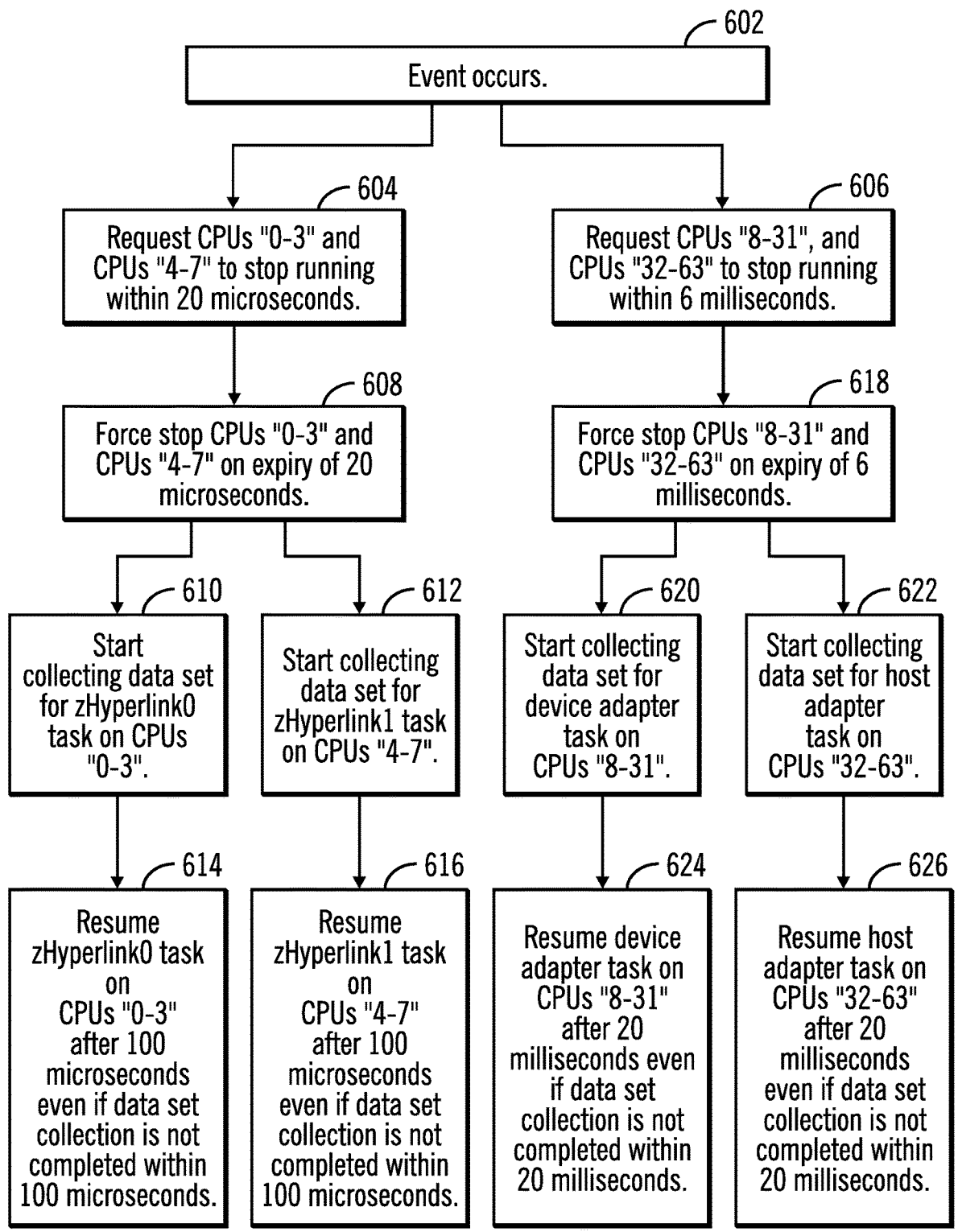
FIG. 6 illustrates a first flowchart that shows how a plurality of CPUs are stopped for data collection based on attributes of tasks, in accordance with certain embodiments.

FIG. 6 illustrates a flowchart that shows how a plurality of CPUs 104, 106 are stopped for data collection based on attributes of tasks, in accordance with certain embodiments. The operations shown in FIG. 6 may be performed by the data capture application 132 that executes in the storage controller 102, in accordance with the exemplary configuration of processors, task categories, and tasks shown in the computing environment 100 via FIGS. 4-5.

Control starts at block 602 in which the data capture application 132 determines that an event has occurred, and control flows in parallel to block 604, 606.

At block 604, the data capture application 132 requests CPUs "0-3" 502 and CPUs "4-7" 504 to stop running within 20 microseconds as the stop time 426 is 20 microseconds for the zHyperlink0 task 510 and the zHyperlink1 task 512 that execute on the CPUs "0-3" 502 and CPUs "4-7" 504. If the CPUs "0-3" 502 and CPUs "4-7" 504 do not stop within 20 microseconds, then the data capture application 132 forces the CPUs "0-3" 502 and CPUs "4-7" 504 to stop (as shown via reference numeral 608), and control proceeds in parallel to block 610 and 612.

At block 610, the data capture application 132 starts collecting the data set for the zHyperlink0 task 510 on CPUs "0-3" 502 (once the data set for the zHyperlink0 task 510 reflecting the state of the storage controller 102 is collected then the CPUs "0-3" 502 can resume the zHyperlink0 task 510). The data capture application 132 resumes the zHyperlink0 task 510 on CPUs "0-3" 502 after 100 microseconds (as the data set collection time 426 for the zHyperlink0 task 510 which is in task category 416 is 100 microseconds) even if data set collection is not completed within 100 microseconds (at block 614).

At block 612, the data capture application 132 starts collecting data set for the zHyperlink1 task 512 on CPUs "4-7" 504 (once the data set for the zHyperlink1 512 task reflecting the state of the storage controller 102 is collected then the CPUs "4-7" 512 can resume the zHyperlink1 task 512). The data capture application 132 resumes the zHyperlink1 task 512 on CPUs "4-7" 504 after 100 microseconds (as the data set collection time 426 for the zHyperlink1 task 512 which is in task category 416 is 100 microseconds) even if data set collection is not completed within 100 microseconds (at block 616).

At block 606, the data capture application 132 requests CPUs "8-31" 506 and CPUs "32-63" 508 to stop running within 6 milliseconds as the stop time 412 is 6 milliseconds for the device adapter task 514 and the host adapter task 516 that execute on the CPUs "8-31" 506 and CPUs "32-63" 508. If the CPUs "8-31" 506 and CPUs "32-63" 508 do not stop within 6 milliseconds, then the data capture application 132 forces the CPUs "8-31" 506 and CPUs "32-63" 508 to stop (as shown via reference numeral 618), and control proceeds in parallel to block 620 and 622.

At block 620, the data capture application 132 starts collecting the data set for the device adapter task 514 on CPUs "8-31" 506 (once the data set for the device adapter task 514 reflecting the state of the storage controller 102 is collected then the CPUs "8-31" 506 can resume the device adapter task 514). The data capture application 132 resumes the device adapter task 514 on CPUs "8-31" 506 after 20 milliseconds (as the data set collection time 414 for the device adapter task 514 which is in task category 402 is 20 milliseconds) even if data set collection is not completed within 20 milliseconds (at block 624).

At block 622, the data capture application 132 starts collecting data set for the host adapter task 516 on CPUs "32-63" 508 (once the data set for the host adapter task 516 reflecting the state of the storage controller 102 is collected then the CPUs "32-63" 508 can resume the host adapter task 516). The data capture application 132 resumes the host adapter task 516 on CPUs "32-63" 508 after 20 milliseconds (as the data set collection time 414 for the host adapter task 516 which is in task category 402 is 20 milliseconds) even if data set collection is not completed within 20 milliseconds (at block 626).

Therefore, FIG. 6 illustrates exemplary embodiments in which different data sets are collected for different tasks based on attributes of tasks categories of the tasks, by stopping CPUs for amounts of time indicated in the attributes of the task categories of the tasks.

In FIG. 6, the CPU that is running a task is allowed no more than the stop time to stop, and the CPU is stopped for no more than the data set collection time for collection of the data set, in response to the occurrence of an event. By limiting the duration of the stop time and the data set collection time, the timing requirements on tasks that run on the CPUs are satisfied. For example, if a task is required to complete in 300 milliseconds, the stop time may be set to 40 milliseconds and the data set collection time may be set to 60 milliseconds so that the likelihood of task completion is high.

In embodiments shown in FIG. 6, the tasks associated with a task category have to be completed within a third predetermined amount of time, where the first predetermined amount of time (e.g., stop time) and the second predetermined amount of time (data set collection time) are set such the tasks associated with the task category are completed within the third predetermined amount of time. The first, second and third predetermined amounts of time may be set by a user or an administrator based on balancing the need for data collection in response to an occurrence of an event, and the need for completing tasks within time limitations. Different data sets may be collected in different amounts of time for different types of tasks with different time requirements.

Figure 7:
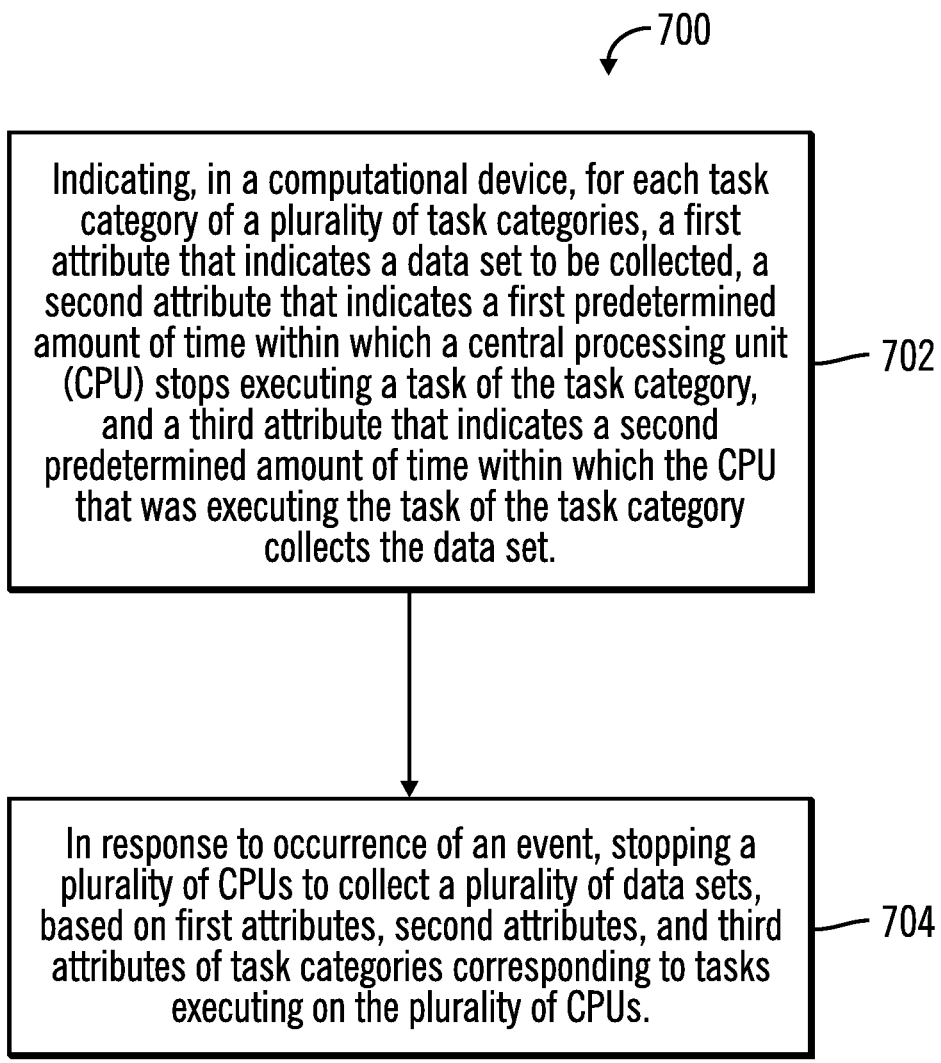
FIG. 7 illustrates a second flowchart that shows how a plurality of CPUs are stopped for data collection based on attributes of tasks, in accordance with certain embodiments.

FIG. 7 illustrates a second flowchart 700 that shows how a plurality of CPUs 104, 106 are stopped for data collection based on attributes of tasks, in accordance with certain embodiments. The operations shown in FIG. 7 may be performed by the data capture application 132 that executes in the storage controller 102, in accordance with the configuration shown in the computing environment 100

Control starts at block 702 in which the data capture application 132 generates an indication for each task category of a plurality of task categories 120, 122, of a first attribute 204 that indicates a data set to be collected, a second attribute 206 that indicates a first predetermined amount of time (e.g., stop time 206) within which a central processing unit (CPU) stops executing a task of the task category, and a third attribute 208 that indicates a second predetermined amount of time (e.g., a data set collection time 208) within which the CPU that was executing the task of the task category collects the data set.

From block 702 control proceeds to block 704 in which, in response to occurrence of an event, the data capture application 132 stops a plurality of CPUs to collect a plurality of data sets, based on first attributes, second attributes, and third attributes of task categories corresponding to tasks executing on the plurality of CPUs 104, 106.

Therefore, FIGS. 1-7 illustrate certain embodiment in which different data sets are collected for different types of tasks with different time requirements based on attributes of task categories of tasks. Additionally, different CPUs are stopped from executing different tasks for different amounts of time, based on attributes of task categories of tasks. Furthermore, different CPUs collect different data sets for different amounts of time, based on attributes of task categories of tasks.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
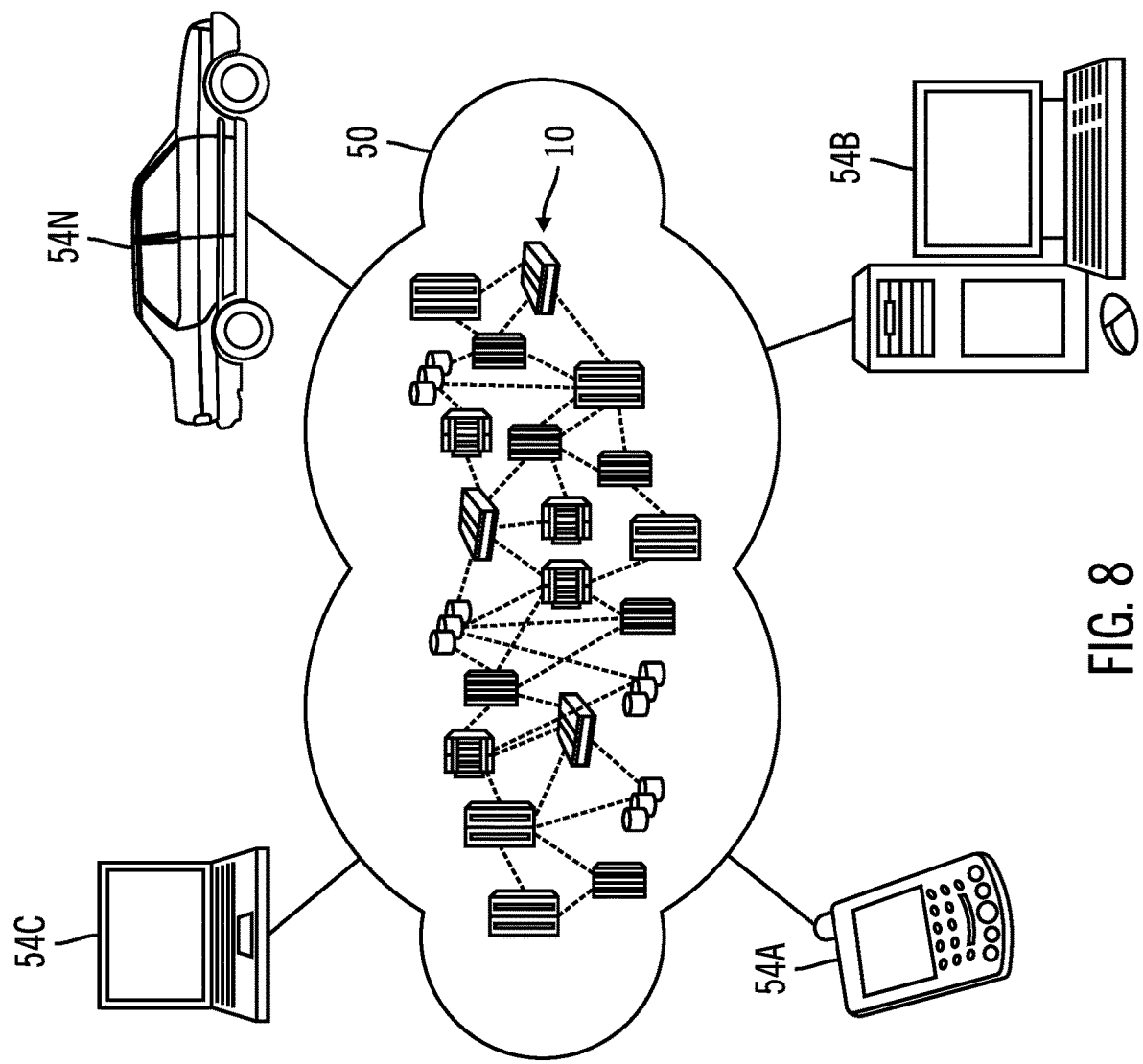
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
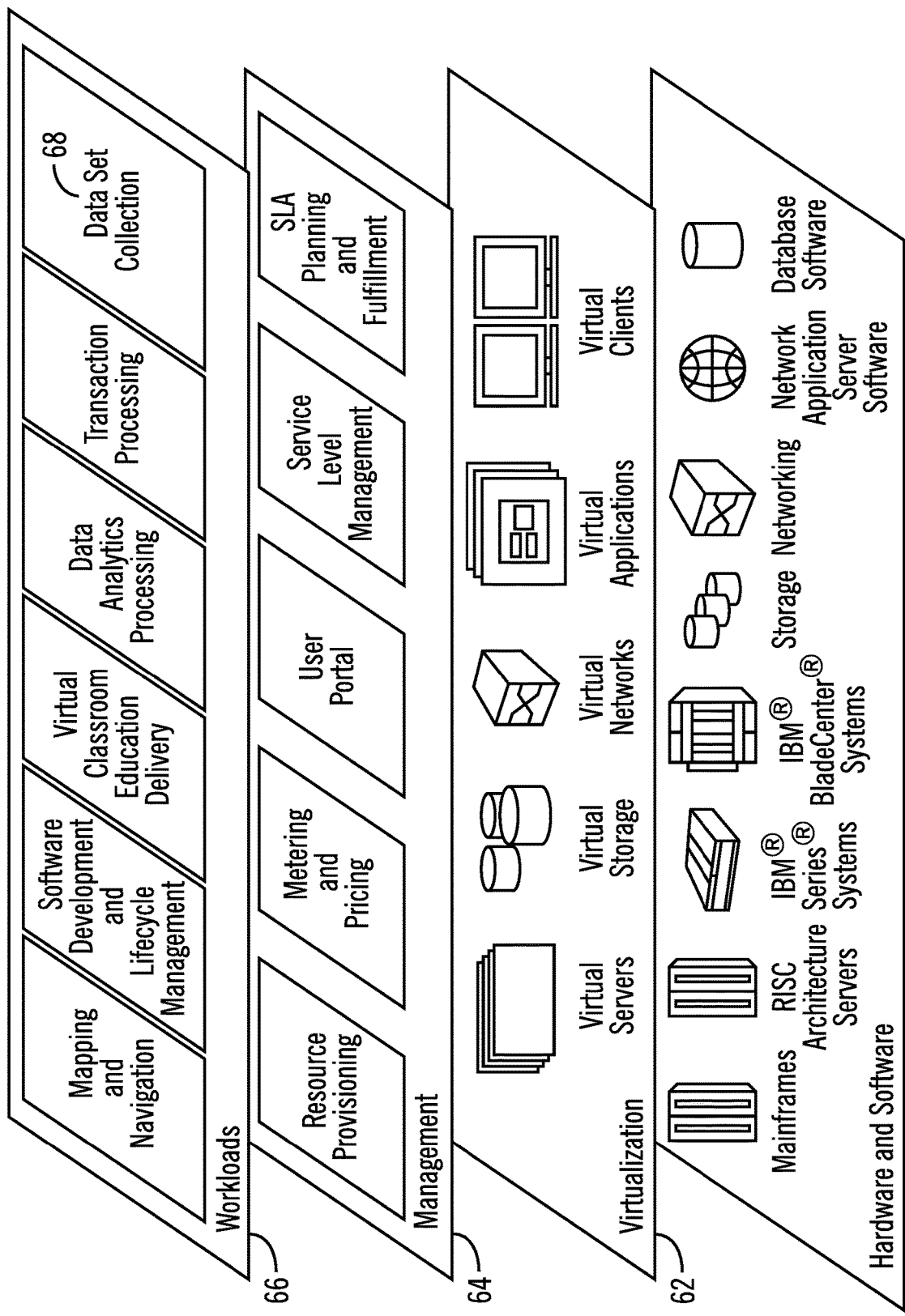
FIG. 9 illustrates a block diagram of further details of the cloud computing environment of FIG. 8, in accordance with certain embodiments.

Referring now to FIG. 9 a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data set collection 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
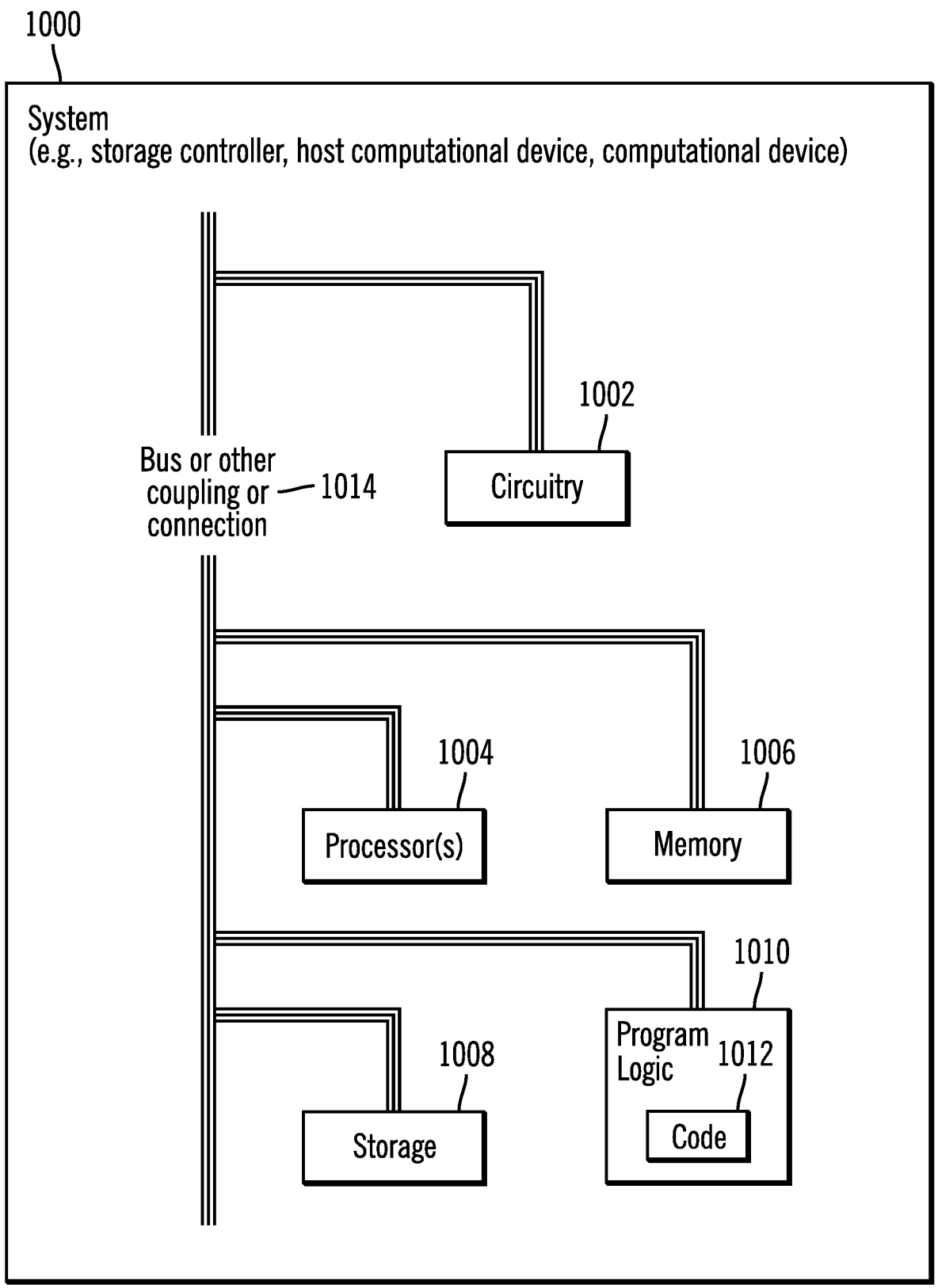
FIG. 10 illustrates a block diagram of a computational system that shows certain elements that may be included in the storage controller, and/or the host computational devices, as described in FIGS. 1-9, in accordance with certain embodiments.

FIG. 10 illustrates a block diagram that shows certain elements that may be included in the storage controller 102, and the host computational devices 108, 110 or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   indicating, in a computational device, for each task category of a plurality of task categories, a first attribute that indicates a data set to be collected, a second attribute that indicates a first predetermined amount of time within which a central processing unit (CPU) stops executing a task of the task category, and a third attribute that indicates a second predetermined amount of time within which the CPU that was executing the task of the task category collects the data set; and
   in response to occurrence of an event, stopping a plurality of CPUs to collect a plurality of data sets, based on first attributes, second attributes, and third attributes of task categories corresponding to tasks executing on the plurality of CPUs, wherein:
      a first set of CPUs execute tasks of a first task category and a second set of CPUs execute tasks of a second task category;
      a first attribute of the first task category calls a first function for data collection, and a first attribute of the second task category calls a second function for data collection, wherein tasks that execute on the first set of CPUs are resumed later than tasks that execute on the second set of CPUs after being stopped, in response to the data collection via the first function and the data collection via the second function not being allowed to be completed by constraints imposed by the third attribute of the first task category and the third attribute of the second task category; and
      a time allowed for the first function for data collection to complete is set based on performance requirements of the first task category, and a time allowed for the second function for data collection to complete is set based on performance requirements of the second task category.

2. The method of claim 1, the method further comprising:
   in response to completion of collecting of a data set via a selected CPU that was executing a selected task at a time of stopping the selected CPU for the collecting of the data set, resuming execution of the selected task in the selected CPU.

3. The method of claim 2, wherein the data set is a selected data set that is indicative of a state of the computational device, and wherein for a selected CPU that is executing a selected task:
   the first predetermined amount of time comprises a stop time that indicates an amount of time within which the selected CPU executing the selected task has to stop executing the selected task;
   the second predetermined amount of time comprises a data set collection time that indicates an amount of time within which a selected data set is to be collected after stopping the selected CPU executing the selected task; and
   the first attribute includes a function that when executed causes the selected data set to be collected.

4. The method of claim 1, wherein tasks associated with the task category have to be completed within a third predetermined amount of time, and wherein the first predetermined amount of time and the second predetermined amount of time are set such that the tasks associated with the task category are completed within the third predetermined amount of time.

5. The method of claim 1, wherein the first task category includes a task for managing a cache of a storage controller, and wherein the second task category includes a task for managing a link between the storage controller and a host computational device.

6. The method of claim 5, wherein the time allowed for the first function for data collection to complete for the task for managing the cache of the storage controller is less than the time allowed for the second function for data collection to complete for the task for managing the link between the storage controller and the host computational device.

7. A system, comprising:
   a memory; and
   a plurality of central processing units (CPUs) coupled to the memory, wherein the system performs operations, the operations comprising:
   indicating for each task category of a plurality of task categories, a first attribute that indicates a data set to be collected, a second attribute that indicates a first predetermined amount of time within which a central processing unit (CPU) stops executing a task of the task category, and a third attribute that indicates a second predetermined amount of time within which the CPU that was executing the task of the task category collects the data set; and in response to occurrence of an event, stopping a plurality of CPUs to collect a plurality of data sets, based on first attributes, second attributes, and third attributes of task categories corresponding to tasks executing on the plurality of CPUs, wherein:

a first set of CPUs execute tasks of a first task category and a second set of CPUs execute tasks of a second task category;

a first attribute of the first task category calls a first function for data collection, and a first attribute of the second task category calls a second function for data collection, wherein tasks that execute on the first set of CPUs are resumed later than tasks that execute on the second set of CPUs after being stopped, in response to the data collection via the first function and the data collection via the second function not being allowed to be completed by constraints imposed by the third attribute of the first task category and the third attribute of the second task category; and a time allowed for the first function for data collection to complete is set based on performance requirements of the first task category, and a time allowed for the second function for data collection to complete is set based on performance requirements of the second task category.

8. The system of claim 7, the operations further comprising:

in response to completion of collecting of a data set via a selected CPU that was executing a selected task at a time of stopping the selected CPU for the collecting of the data set, resuming execution of the selected task in the selected CPU.

9. The system of claim 8, wherein the data set is a selected data set that is indicative of a state of the system, and wherein for a selected CPU that is executing a selected task:

the first predetermined amount of time comprises a stop time that indicates an amount of time within which the selected CPU executing the selected task has to stop executing the selected task;

the second predetermined amount of time comprises a data set collection time that indicates an amount of time within which a selected data set is to be collected after stopping the selected CPU executing the selected task; and the first attribute includes a function that when executed causes the selected data set to be collected.

10. The system of claim 7, wherein tasks associated with the task category have to be completed within a third predetermined amount of time, and wherein the first predetermined amount of time and the second predetermined amount of time are set such that the tasks associated with the task category are completed within the third predetermined amount of time.

11. The system of claim 7, wherein the system is a storage controller, wherein the first task category includes a task for managing a cache of the storage controller, and wherein the second task category includes a task for managing a link between the storage controller and a host computational device.

12. The system of claim 11, wherein the time allowed for the first function for data collection to complete for the task for managing the cache of the storage controller is less than the time allowed for the second function for data collection to complete for the task for managing the link between the storage controller and the host computational device.

13. A computer program product, the computer program product comprising a computer readable storage medium having computer readable program code embodied therewith, the computer readable program code configured to perform operations on a computational device, the operations comprising:

indicating, in the computational device, for each task category of a plurality of task categories, a first attribute that indicates a data set to be collected, a second attribute that indicates a first predetermined amount of time within which a central processing unit (CPU) stops executing a task of the task category, and a third attribute that indicates a second predetermined amount of time within which the CPU that was executing the task of the task category collects the data set; and in response to occurrence of an event, stopping a plurality of CPUs to collect a plurality of data sets, based on first attributes, second attributes, and third attributes of task categories corresponding to tasks executing on the plurality of CPUs, wherein:

a first set of CPUs execute tasks of a first task category and a second set of CPUs execute tasks of a second task category;

a first attribute of the first task category calls a first function for data collection, and a first attribute of the second task category calls a second function for data collection, wherein tasks that execute on the first set of CPUs are resumed later than tasks that execute on the second set of CPUs after being stopped, in response to the data collection via the first function and the data collection via the second function not being allowed to be completed by constraints imposed by the third attribute of the first task category and the third attribute of the second task category; and a time allowed for the first function for data collection to complete is set based on performance requirements of the first task category, and a time allowed for the second function for data collection to complete is set based on performance requirements of the second task category.

14. The computer program product of claim 13, the operations further comprising:

in response to completion of collecting of a data set via a selected CPU that was executing a selected task at a time of stopping the selected CPU for the collecting of the data set, resuming execution of the selected task in the selected CPU.

15. The computer program product of claim 14, wherein the data set is a selected data set that is indicative of a state of the computational device, and wherein for a selected CPU that is executing a selected task:

the first predetermined amount of time comprises a stop time that indicates an amount of time within which the selected CPU executing the selected task has to stop executing the selected task;

the second predetermined amount of time comprises a data set collection time that indicates an amount of time within which a selected data set is to be collected after stopping the selected CPU executing the selected task; and the first attribute includes a function that when executed causes the selected data set to be collected.

16. The computer program product of claim 13, wherein tasks associated with the task category have to be completed within a third predetermined amount of time, and wherein the first predetermined amount of time and the second predetermined amount of time are set such that the tasks associated with the task category are completed within the third predetermined amount of time.

17. The computer program product of claim 13, wherein the first task category includes a task for managing a cache of a storage controller, and wherein the second task category includes a task for managing a link between the storage controller and a host computational device.

18. The computer program product of claim 17, wherein the time allowed for the first function for data collection to complete for the task for managing the cache of the storage controller is less than the time allowed for the second function for data collection to complete for the task for managing the link between the storage controller and the host computational device.

* * * * *